United States Patent Office 3,849,384
Patented Nov. 19, 1974

3,849,384
PROCESS FOR PREPARING A POLYMER COMPRISING ACRYLONITRILE, AN AROMATIC OLEFIN AND A TERPENE
Eric Nield, Watton-at-Stone, England, assignor to Imperial Chemical Industries Limited, London, England
No Drawing. Filed May 17, 1972, Ser. No. 254,084
Claims priority, application Great Britain, May 17, 1971, 15,266/71
Int. Cl. C08f 15/40
U.S. Cl. 260—80.78                                  6 Claims

ABSTRACT OF THE DISCLOSURE

A process is provided for the polymerisation of acrylonitrile and at least one aromatic olefine in which a substantially odourless and taste free copolymer of acrylonitrile, containing 50 to 95% molar of units from acrylonitrile and 50 to 5% molar of units from at least one aromatic olefine, is obtained with randomly distributed units of aromatic olefine in a polymerisation mixture containing acrylonitrile and aromatic olefine and at least one alkanethiol whilst adding monomer feed containing aromatic olefine and at least one ethylenically unsaturated compound derived from a terpene at a rate determined by the rate of polymerisation.

This invention relates to a process for making copolymers of acrylonitrile and aromatic olefines, and in particular to copolymers containing a high proportion of acrylonitrile.

Copolymers of aromatic olefine containing a high proportion of acrylonitrile and methods for making them are described in U.K. Specifications 663,268 and 1,185,305. In these specifications thiols such as butane-1-thiol, octane - 1 - thiol and dodecane-1-thiol are used as chain transfer agents to ensure that the resulting polymer has substantially constant molecular weight and chain length. The copolymers described in U.K. Specification 1,185,305 in particular may be used in the packaging of foodstuffs and medicines as films, and moulded containers such as bottles. If a thiol of low volatility is used such as octane-1-thiol, then the polymer and resulting film or moulding may possess an unpleasant odour and taint any product packaged within that film or moulding unless thiol is removed. Such removal of thiol from the polymer or latices may require an expensive stripping stage in the polymerisation and may be time consuming. Alternatively if a thiol of high volatility is used such as butane-1-thiol then the polymerisation reaction becomes slow to initiate and has a long reaction time. Certain ethylenically unsaturated compounds such as for example those derived from terpenes, for instance, terpinolene, can be used as chain transfer agents but they suffer from broadly the same disadvantages as thiols of high volatility in that the polymerisation reaction becomes difficult to initiate and is not easily maintained. We have now found that substantially taste free and odourless copolymers can be prepared by using as chain transfer agents a combination of thiols and ethylenically unsaturated compound derived from a terpene.

According to the present invention, a process is provided for the polymerisation of acrylonitrile and at least one aromatic olefine in which a substantially odourless and taste free copolymer of acrylonitrile, containing 50 to 95% molar (preferably 80 to 90% molar) of units from acrylonitrile and 50 to 5% molar of units from at least one aromatic olefine, is obtained with randomly distributed units of aromatic olefine in a polymerisation mixture containing acrylonitrile and aromatic olefine and at least one alkanethiol whilst adding monomer feed containing aromatic olefine and at least one ethylenically unsaturated compound derived from a terpene at a rate determined by the rate of polymerisation.

The aromatic olefine is selected from those of the formula $CH_2{:}CR \cdot Ar$ and also acenaphthylene, indene and coumarone. In this formula R is hydrogen or methyl and Ar is an optionally ring-substituted residue of aromatic character having not more than 3 rings and each substituent (if any) having not more than 4 carbon atoms. Examples of such olefines include styrene, $\alpha$ - methylstyrene, o - methylstyrene, m - methylstyrene, p-methylstyrene, m - vinylphenol, p - trimethylsilylstyrene, 2,5-dimethylstyrene, p - methoxystyrene, 1 - vinylnaphthalene, p - dimethylaminostyrene, Ar - dibromostyrene, p-acetamidostyrene, 2 - vinylthiophene, 3-vinylphenanthrene, 2 - methyl - 5 - vinylpyridine and N-vinylcarbazole. The preferred composition is one in which styrene or $\alpha$-methylstyrene is the predominant aromatic olefine.

The thiols which are commonly used as chain transfer agents so as to control the molecular weight of the polymer are usually alkane thiols. The alkane residue can contain up to 20 carbon atoms and primary, secondary or tertiary thiols may be used. Commonly used thiols are listed in the following table in which boiling points at atmospheric pressure are also given.

| Thiol: | Boiling point (° C.) |
| --- | --- |
| Methanethiol | 7. |
| Ethanethiol | 35. |
| 1-propanethiol | 68. |
| 2-propanethiol | 60. |
| 1-butanethiol | 98. |
| 2-butanethiol | 88. |
| 1-pentanethiol | 126. |
| 2-pentanethiol | 119. |
| 3-pentanethiol | 119. |
| 1-hexanethiol | 150. |
| 1-heptanethiol | 176. |
| Octanethiol (primary) | 180–210. |
| Octanethiol (secondary) | 180–190. |
| Octanethiol (tertiary) | 155–167. |
| Nonanehtiol (tertiary) | 190–210. |
| 1-decanethiol | 240. |
| Undecanethiol (secondary) | 215–240. |
| Dodecanethiol (primary) | 142–145 (15 torr). |
| Dodecanethiol (secondary) | 125–130 (10 torr). |

Other thiols which are isomers of those listed above may also be used.

By ethylenically unsaturated compound derived from a terpene, we mean compounds which are built up of two or more units of isoprene and contain at least one ethylenic bond. Preferably such compounds are derived from menthadiene, such as for example terpinolene and limonene (either of its optical isomers) or from bicyclic terpenes such as those described in U.K. Specification 971,214 or from isopulegol and linalool as described in U.S. Specifications 3,160,613 and 3,160,616.

Hence in accordance with the process of the invention the initial charge to the reaction vessel contains at least one thiol and the monomer feed will contain at least some of the terpene derived compound. In a preferred embodiment, the initial charge contains a thiol and the feed contains initially a quantity of the same or different thiol from that present in the initial reaction vessel charge but later (preferably before 65% conversion) only the terpene derived compound as chain transfer agent. The use of this preferred embodiment generally leads to the production of copolymers having superior melt stability with good control of polymer molecular weight.

The copolymers of the invention may be made by any means suitable for ensuring the formation of random copolymers. Owing to the great ease with which such aromatic olefines copolymerise in the presence of a high proportion of acrylonitrile, the portion of copolymer formed at the beginning of the reaction tends to be enriched with the aromatic olefine at the expense of the portion of copolymer formed at the end of the reaction: and the latter tends therefore to have the disadvantageous properties of crystalline polyacrylonitrile unless precautions are taken to feed the monomers (or at least the aromatic olefine) into the reaction medium throughout the course of the polymerisation. U.K. Patent Specification 663,268 describes a method of doing this, in which acrylonitrile and styrene or α-methylstyrene are added to an aqueous medium at the reflux temperature, the aqueous medium containing a water-soluble peroxy catalyst and a dispersing agent, and the rates of addition being such as to maintain a substantially constant reflux temperature in the aqueous medium. U.K. Specifications 1,197,721 and 1,185,305 describe a method in which the rate of addition is determined by the heat evolved by the polymerisation. The copolymer may be subsequently blended with a graft copolymer having a rubber substrate such as those described in U.K. Specifications 1,143,408, 1,185,306 and 1,185,307.

The copolymer of the invention may be the superstrate of a graft copolymer having a substrate of a diene rubber. Such graft copolymers and methods for making them are described in U.K. Specification 1,185,306 in which at least part of the aromatic olefine is fed to the reaction mixture containing acrylonitrile and a diene rubber at a rate determined by the rate of polymerisation. Such a procedure can lead to the formation of a blend of the graft copolymer with a resin copolymer having the same composition as that of the superstrate of the graft copolymer. Alternatively the graft copolymer can be subsequently blended with a compatible resin.

The copolymers prepared by the method of the invention may be modified by incorporating lubricants, plasticisers, stabilisers, optical brighteners and fillers such as colloidal rubber particles or fibres such as glass, carbon and asbestos fibres before being fabricated into shaped articles.

The copolymers may be fabricated by conventional methods for shaping thermoplastic materials such as moulding, extrusion and casting into films, fibres and moulded articles such as containers. The container may be comoulded from the thermoplastic composition with any other thermoplastic material having suitable melt viscosity at the moulding temperatures such as, for example, rigid PVC in order to confer further improved physical properties on the container. The moulded container may totally enclose the contents of the container so as to form a package (such as for example a keg or a drum) or it may partially enclose the contents and be sealed in some other way, such as for example a bottle (which generally has an impermeable cap or stopper made from a material other than the composition of the bottle). The compositions can be heat-sealed if desired.

The moulded container of the package protects the contents from an environment such as air, water (including sea-water), earth or toxic or noxious gases or liquids. Conversely, the environment is protected from emissions from the contents of the package. In particular, the contents may be foodstuffs, such as for example beverages (in particular carbonated drinks where the package prevents egress of carbon dioxide and ingress of oxygen), sauces or dairy products; or they may be medicines, corrodible materials such as for example metal components or electronic apparatus, corrosive materials such as for example acids, chemicals sensitive to an environment and gases under pressure or in liquefied form (e.g. refrigerants, aerosol propellants). The package may be in the form of a large container for bulk handling or in the form of a pack for dispensing small quantities.

The copolymers of the invention are particularly useful for the packaging of foodstuffs and medicines because of the substantial absence of odour, taste and tainting of the packaged article.

The invention is illustrated by the following examples which were carried out using the apparatus described in Example 1 of U.K. Specification 1,197,721 except that 4-methyl pentene-1 was used instead of isopentane in the jacket and that the polymerisation reactions were carried out at about 60° C. Example 1 is included by way of a comparative example. The initial charge in Examples 1 to 4 contained acrylonitrile (683 cm.$^3$), styrene (7.8 cm.$^3$) and distilled water (1400 cm.$^3$). The initial charge was purged with nitrogen and heated to 60° C. The monomer feed contained styrene (161 cm.$^3$); the quantities being chosen such that the resulting homogeneous copolymer should contain 87.5% molar of units from acrylonitrile and 12.5% molar of units from styrene.

In order to compare the stability of prepared materials at elevated temperatures, about 15 g. of the material was loaded into a cylindrical container thermostatically controlled at the required temperature, generally about 230° C. The container had an internal diameter of 1 cm., and a length of 20 cm. One end of the cylinder was fitted with a die having an internal diameter of 0.5 mm. and a length of 3.2 mm. The polymer was heated for three minutes, and then a small portion was extruded through the die by a ram moving at a speed of 0.0156 cm. s.$^{-1}$, the polymer being extruded through the die at a shear rate of 1000 s.$^{-1}$. The stress necessary to maintain this shear rate was measured using a pressure gauge fitted to the ram, and the viscosity calculated by the ratio of the measured stress to the shear rate. While maintaining the bulk of the material at a temperature of 230° C., further samples of the material were extruded at convenient time intervals. Observations of the changes with time of the viscosity, extrudate quality and colour, were recorded as a measure of the thermal stability of the polymer melt at the measuring temperature.

After prolonged heating at 230° C., the viscosity of some of the materials showed an increase, and the period of heating required to produce this change in viscosity is given in the table as the "time to set up."

The polymers were tested for odour by extruding a sample of the polymer at 200° C. into a glass container, stoppering the container, allowing the polymer to cool and sampling the odour inside the container.

EXAMPLE 1

To the initial charge, ammonium dodecyl benzene sulphonate (37.5 g.), terpinolene (2.2 cm.$^3$) and initiator (5 cm.$^3$ of aqueous solution containing 5% w./v. ammonium persulphate) were added. The styrene monomer feed contained terpinolene (2.2 cm.$^3$). After 10 minutes, styrene feed (4 cm.$^3$) was added together with aqueous ferrous sulphate solution (5 cm.$^3$; 0.1% w./v.). After a further 5 minutes, styrene feed (2 cm.$^3$) was added together with aqueous ferrous sulphate solution (2 cm.$^3$) and initiator (1 cm.$^3$). After a further 15 minutes, styrene feed (6 cm.$^3$) was added, but the temperature dropped rapidly indicating that no polymerisation had taken place.

The experiment was repeated as above but using (i) ammonium dodecyl benzene sulphonate (15 g.) and terpinolene (4 cm.$^3$) in both the initial charge and styrene monomer feed, and (ii) potassium dihydrogen phosphate (1.5 g.) and $C_{14-16}$ alkyl sodium sulphonate (15 g.) in place of the ammonium dodecylbenzene sulphonate. In both cases (i) and (ii), no polymerisation took place.

EXAMPLE 2

To the initial charge, ammonium dodecylbenzene sulphonate (37.5 g.), octane-1-thiol (3 cm.$^3$) and initiator (5 cm.$^3$ of aqueous solution containing 5% w./v. ammonium persulphate) were added. The styrene monomer feed contained terpinolene (4 cm.$^3$). The course of the reaction is shown in the following table where the time after adding initiator is in minutes and the column headed "styrene" gives the volume (in cm.$^3$) of styrene and terpinolene added to the reaction mixture in excess of the styrene present in the initial charge.

| Time | Temperature (° C.) | Styrene | Volume (cm.$^3$) 4-methyl-pentene-1 distilled off | Comments |
|---|---|---|---|---|
| 0 | 60.0 | | | 5 cm.$^3$ initiator added. |
| 10 | 66.0 | 4 | | 2 cm.$^3$ further initiator added. |
| 30 | 63.0 | 38 | 800 | Do. |
| 40 | 62.0 | 50 | 1,300 | 2 cm.$^3$ aqueous ferrous sulphate solution (0.1% w./v.) added. |
| 45 | 61.5 | 59 | 1,500 | 7 cm.$^3$ further initiator added. |
| 80 | 61.8 | 100 | 2,650 | 2.5 cm.$^3$ further initiator added. |
| 110 | 60.5 | 123 | 3,350 | Reaction terminated. |

Excess monomers were removed by heating for 1.5 hours at 50° C. at a pressure of 71 kN./m.$^2$ and the polymer was coagulated using aqueous sodium sulphate solution containing 75 g. anhydrous sodium sulphate, washed four times with water (1 dm.$^3$ each wash at 60° C.) and dried in a vacuum oven at 95° C. The copolymer contained 86.7% molar of units from acrylonitrile and had a reduced viscosity of 0.98 as measured at 25° C. on a solution of the polymer in dimethyl formamide containing 0.5 g. of polymer in 100 cm.$^3$ of solution (i.e. 0.5% w./v.). The polymer was found to have a melt stability of 20 to 40 minutes at 230° C. and to be odour-free on extrusion.

EXAMPLE 3

The method of Example 2 was repeated except that the reaction mixture was buffered at pH 5.5 using potassium dihydrogen phosphate (1.5 g.) and sulphuric acid and that sodium dodecylbenzene sulphonate (15 g.) was used in place of ammonium dodecylbenzene sulphonate.

The polymer was extracted by the procedure of Example 2 except that a portion of the polymer was coagulated using methanol. The polymer had a melt stability of 20 minutes at 230° C. irrespective of the coagulant but that coagulated with methanol was light orange and that coagulated with sodium sulphate was dark orange after 20 minutes at 230° C. The polymer had a reduced viscosity of 0.96 (at 0.5% w./v. at 25° C. in dimethyl formamide) and was odour-free on extrusion.

EXAMPLE 4

To the initial charge sodium dodecylbenzene sulphonate (15 g.), octane-1-thiol (3 cm.$^3$), potassium dihydrogen phosphate (1.5 g.), initiator (6 cm.$^3$ of aqueous solution containing 5% w./v. ammonium persulphate) and sulphuric acid to adjust the pH to 5.5 were added. The initial styrene feed consisted of styrene (99 cm.$^3$) and propane-1-thio (1 cm.$^3$) and the final styrene feed consisted of styrene (62 cm.$^3$) and terpinolene (1.5 cm.$^3$). The course of the reaction is shown in the following table.

| Time | Temperature (° C.) | Styrene | Volume (cm.$^3$) 4-methyl-pentene-1 distilled off | Comments |
|---|---|---|---|---|
| 0 | 60.5 | | | 6 cm.$^3$ initiator added. |
| 10 | 66.0 | 5 | | Further 1 cm.$^3$ initiator added. |
| 35 | 63.5 | 50 | 1,300 | |
| 45 | 63.5 | 64 | 1,650 | Do. |
| 60 | 67.5 | 100 | 2,500 | Further 1 cm.$^3$ initiator added. Initial styrene feed consumed. Final styrene feed commenced. 62% conversion. |
| 80 | 61.5 | 142 | 3,800 | Reaction terminated. |

The polymer was extracted by the procedure of Example 2 except that a portion of the polymer was coagulated using methanol. Results of stability testing are presented in the following table.

| Coagulant | Melt stability at 230° C. | Time (minutes) to set up at 230° C. |
|---|---|---|
| Sodium sulphate | 110 | 110 |
| Methanol | 50 | 60 |

Both polymers were found to be odour-free on extrusion, and to have a reduced viscosity of 1.26 (at 0.5% w./v. at 25° C.) in dimethyl formamide.

EXAMPLE 5

A homogeneous copolymer of acrylonitrile and styrene was prepared using a conventional autoclave having a capacity of about 120 dm.$^3$ and fitted with a stirrer and cooling jacket. The autoclave was charged with acrylonitrile (39.1 dm.$^3$), styrene (0.45 dm.$^3$), sodium dodecylbenzene sulphonate (600 g. as 20% aqueous solution), sulphuric acid (60 cm.$^3$ of 10% v./v. aqueous solution), potassium dihydrogen phosphate (60 g.), octane-1-thiol (175 cm.$^3$) and water (53.5 dm.$^3$). After purging the vessel with nitrogen, the reactants were heated to 60° C. and the initiator (aqueous 5% ammonium persulphate solution) was added gradually until the polymerisation started, 300 cm.$^3$ of initiator being used. During the reaction, more styrene containing charge transfer agent (propane-1-thiol up to 60% conversion and terpinolene thereafter) was added according to the heat output of the reaction as determined by the rise in temperature and flow rate of the circulating cooling water in the jacket. The heat liberated was computed from the flow rate and temperature difference electronically. The feed mixture containing 9.00 dm.$^3$ styrene and 90 cm.$^3$ propane-1-thiol to 60% conversion and 5.3 dm.$^3$ styrene and 135 cm.$^3$ terpinolene thereafter was added at a rate determined by the heat liberated by the polymerisation reaction. The course of the reaction is shown in the following table, where the time after completing the addition of initiator is in minutes, the column headed "styrene" gives the volume in dm.$^3$ styrene and chain transfer agent added to the reaction mixture in excess of the 0.45 dm.$^3$ of styrene added initially, temperatures of the reaction mixture are given in degrees C. and "counts" represents the amount of heat liberated by the polymerisation reaction.

After 240 minutes the reaction was short stopped, excess monomers were removed by heating for 6 hours at 50–65° C. at a pressure of 71 kN./m.$^2$ and the polymer was coagulated with methanol (120 dm.$^3$) at 60° C., washed four times with water (100 dm.$^3$ each wash at 50–90° C.) filtered and dried in an oven with circulating air. The polymer contained 87.2% molar units from acrylonitrile and had a reduced viscosity of 1.02 as measured at 25° C. on a solution of the polymer in dimethyl formamide containing 0.5 g. polymer in 100 cm.$^3$ of solution.

| Time (minutes) | Counts | Styrene | Temperature Vessel | Temperature Jacket | Comments |
|---|---|---|---|---|---|
| 0 | | | 60.2 | 46 | 25 cm.$^3$ activator (2.5% w./v. aqueous solution of sodium metabisulphite) added. |
| 20 | 0 | 0 | 61.3 | 46 | Further 100 cm.$^3$ activator added. |
| 35 | 51 | 0.12 | 57.8 | 46 | Further 50 cm.$^3$ activator and 25 cm.$^3$ initiator added. |
| 51 | 87 | 0.40 | 56.2 | 46 | Further 50 cm.$^3$ activator added. |
| 76 | 123 | 0.95 | 56.6 | 46 | |
| 106 | 183 | 2.05 | 58.4 | 46 | |
| 126 | 222 | 2.79 | 60.0 | 46 | |
| 136 | 241 | 3.15 | 61.0 | 46 | |
| 161 | 301 | 40.5 | 62.0 | 46 | |
| 186 | 382 | 5.10 | 61.7 | 46 | Further 25 cm.$^3$ initiator added. |
| 195 | 411 | 5.51 | 63.0 | 46 | Styrene/thiol feed terminated, styrene/terpinolene feed commenced. |
| 213 | 411+74 | 6.66 | 66.7 | 46 | |
| 240 | 411+172 | 7.63 | 58.0 | 46 | Reaction terminated. |

Bottles were made from samples of the polymer on blow-moulding equipment manufactured by Bekum GmbH., Berlin, model BOA3. The temperature of the melt within the Bekum BOA3 varied from 180° to 185° C. at the hopper to about 200° C. at the die with a mould temperature of 60° C. The bottles had a capacity of 330 cm.³ and weighed about 30 g. The bottles were evaluated for smell as prepared and on standing and also filled with water so as to determine whether there was any tainting of the water. There was a faint odour as made but none remained after 1 day and there was no tainting to water after 7 days.

EXAMPLE 6

The process of Example 5 was repeated except that the initial feed contained octane-1-thiol (170 cm.³) rather than propane-1-thiol and the reaction terminated after 201 minutes. A moderator consisting of an aqueous solution of sodium dimethyldithiocarbamate (0.025% w./v.) was also used. The course of the reaction is shown in the following table.

| Time (minutes) | Counts | Styrene | Temperatures (° C.) Vessel | Temperatures (° C.) Jacket | Moderator volume (dm.³) | Comments |
|---|---|---|---|---|---|---|
| 0 | | | 60.0 | 46 | 0 | 75 cm.³ activator added. |
| 11 | 0 | 0 | 61.5 | 46 | 0 | Further 125 cm.³ activator and 15 cm.³ initiator added. |
| 21 | 38 | 0.05 | 58.0 | 46 | 0 | Further 100 cm.³ activator and 10 cm.³ initiator added. |
| 38 | 80 | 0.25 | 55.8 | 46 | 0 | Further 50 cm.³ activator added. |
| 80 | 160 | 1.45 | 56.1 | 46 | 0 | |
| 95 | 194 | 2.26 | 58.3 | 46 | 0 | |
| 107 | 230 | 3.0 | 60.6 | 46 | 0 | |
| 125 | 287 | 4.35 | 64.3 | 46 | 0.85 | |
| 140 | 347 | 4.90 | 64.0 | 46 | 1.90 | |
| 153 | 395 | 5.52 | 64.0 | 46 | 2.30 | Styrene/thiol feed terminated: styrene/terpinolene feed started. |
| 163 | 395+38 | 6.02 | 63.2 | 46 | 2.30 | |
| 201 | 395+136 | 6.92 | 53.5 | 46 | 2.30 | Reaction terminated. |

Bottles were made from the polymer by the method described in Example 6. The bottles were odour-free as made and imparted no taint on water stored therein for 7 days.

I claim:

1. A process for the preparation of a substantially odourless and taste free copolymer of acrylonitrile and aromatic olefin selected from the group consisting of styrene and α-methyl styrene containing 50 to 95% molar of units of acrylonitrile and 5 to 50% molar of units of at least one aromatic olefin randomly distributed in said copolymer, said process comprising polymerising an initial charge containing acrylonitrile, said aromatic olefin, a free radical polymerisation catalyst and at least one alkanethiol, and adding to said initial charge a monomer feed containing said aromatic olefin and at least one terpene consisting of two isoprene units and having at least one ethylenic bond, said monomer feed being at a rate corresponding pro rata to the rate of production of heat in the copolymer formation, and the amount of the alkanethiol in the initial monomer charge being selected to provide copolymer having a reduced viscosity (measured on a 0.5% w./v. solution in dimethyl formamide at 25° C.) between 0.5 and 1.8, and the amount of said terpene added with the monomer feed containing aromatic olefin being selected to maintain subsequent polymer formed within the range of 0.5 and 1.8.

2. A process according to claim 1 in which the initial polymerisation mixture contains at least one alkanethiol and the monomer feed contains initially a quantity of the same alkanethiol as or different alkanethiol from that present in the initial mixture but later monomer feed contains the terpene and no alkanethiol.

3. A process according to claim 2 in which the alkanethiol in the monomer feed has a boiling point at atmospheric pressure of less than 70° C.

4. A process according to claim 2 in which thiol feeding ceases before 65% conversion of monomer to polymer.

5. A process according to claim 1 in which the copolymer contains between 80% and 90% molar of units derived from acrylonitrile.

6. A process according to claim 1 in which the terpene is a derivative of menthadiene.

References Cited
UNITED STATES PATENTS

| | | | |
|---|---|---|---|
| 2,721,785 | 10/1955 | Zybert | 260—85.5 |
| 2,739,142 | 3/1956 | Jones | 260—85.5 |
| 3,009,895 | 11/1961 | Slocombe | 260—32.8 |
| 3,179,721 | 4/1965 | Herbig | 260—898 |
| 3,541,186 | 11/1970 | Lee | 260—878 |
| 3,299,018 | 1/1967 | Freedman et al. | 260—85.5 R |
| 3,755,277 | 8/1973 | Toups | 260—85.5 R |

HARRY WONG, JR., Primary Examiner

U.S. Cl. X.R.

53—50; 99—171; 215—1 C; 260—32.6 N, 42, 42.17, 42.18, 47 UA, 79.7, 80.6, 80.72, 80.73, 80.75, 898